United States Patent [19]
Denham et al.

[11] Patent Number: 5,697,141
[45] Date of Patent: Dec. 16, 1997

[54] METHOD OF SECURING MEMBERS TOGETHER

[75] Inventors: Keith Denham, Welwyn Garden City; Neil J. Sherry, Stevenage, both of England

[73] Assignee: Avdel Textron Limited, Welwyn Garden City, England

[21] Appl. No.: 593,335

[22] Filed: Jan. 29, 1996

[30] Foreign Application Priority Data

Jan. 31, 1995 [GB] United Kingdom ............ 9501866

[51] Int. Cl.⁶ .................................................. B23P 11/02
[52] U.S. Cl. ............................. 29/525.06; 29/243.522; 29/243.53
[58] Field of Search .................. 29/524.1, 525.06, 29/812.5, 243.521, 243.522, 243.529, 243.53; 411/43

[56] References Cited

U.S. PATENT DOCUMENTS

| | | | |
|---|---|---|---|
| 2,047,341 | 7/1936 | Vaughn et al. | 29/525.06 |
| 2,397,111 | 3/1946 | Huck | 411/43 |
| 4,112,811 | 9/1978 | King | 29/243.522 |
| 4,639,175 | 1/1987 | Wollar | 411/43 |
| 4,897,004 | 1/1990 | Norton | 411/43 |

FOREIGN PATENT DOCUMENTS

| | | |
|---|---|---|
| 57 311 | 7/1941 | Netherlands . |
| 368712 | 3/1932 | United Kingdom . |
| 427843 | 5/1935 | United Kingdom . |
| 454733 | 10/1936 | United Kingdom . |
| 2157788 | 10/1985 | United Kingdom ............ 411/43 |

*Primary Examiner*—David P. Bryant
*Attorney, Agent, or Firm*—Oblon, Spivak, McClelland, Maier & Neustadt, P.C.

[57] ABSTRACT

A method of riveting two metal sheets together including the steps of inserting the shank of a blind rivet through superposed oversized holes in the sheets, and deforming the parts of the sheets immediately surrounding the apertures by compression between the blind head and the preformed head of the rivet when the rivet is placed. The holes are oversized to allow for manufacturing and assembly tolerances, and deformation of the sheets provides interengagement between the sheets and substantially increases their resistance to slipping sideways relative to each other.

12 Claims, 6 Drawing Sheets

METHOD OF SECURING MEMBERS TOGETHER

BACKGROUND OF THE INVENTION

1. Field of the Invention

The invention relates to a method of securing members together. In particular, it relates to securing sheet-like members together so as to enhance resistance to relative slipping.

2. Discussion of the Background

It is common practice to secure sheet-like members, for example metal panels, together by means of fasteners such as nuts and bolts, or rivets. In essence, the fastener comprises a shank, which is passed through superposed apertures or holes in the members, and a preformed head at one end of the shank. The preformed head abuts one face of the members, and a second head is provided at the other end of the shank. The second head is urged towards the preformed head (e.g. by screwing the nut along the bolt, or by deforming the projecting part of the rivet shank) so that the members are clamped together between the two heads. It is relatively easy to develop tension in the fastener shank, so as to hold the members in contact with each other.

However it is also commonly a requirement that the members be firmly restrained against slipping relative to each other in a direction parallel to their own planes. In practice this is not so easy to achieve. It could be achieved by making the holes in the members a tight fit on the shank of the fastener, so that there is no gap between the shank of the fastener and the wall of each hole. However it is not easy to provide this, at least under the conditions which prevail in current manufacturing methods. Holes in metal panels are normally made by punching each panel separately, instead of, for example, by drilling the holes at a single pass after the panels have been assembled in contact with each other. Tolerances in hole size have to be allowed to accommodate inaccuracies in the diameter and positions of the punched holes, and in the relative position of the panels on assembly together. Furthermore, it may be required that the hole in the front panel (i.e. the one nearer the assembly operator) is larger than the hole in the rear panel (i.e. the one further away from the assembly operator), to further facilitate alignment of the holes, and to assist the assembly operator in aligning the holes by visual inspection. Again, it is usually desirable or necessary that both holes are of somewhat larger diameter than the shank of the fastener to be used, to facilitate insertion of the fastener shank into and through the holes. Hence in practice the holes through the members will be oversize to the fastener shank.

Thus if after securing together in this way the members are pulled in opposite senses along a direction parallel to their plane of contact, the only force initially opposing relative movement is the frictional force between the members developed as a result of the compression between the fastener heads, supported by the tension in the fastener shank. In practice this frictional force is limited in strength, so that the resistance of the members to initial relative slip is low. It does not matter that the distance of initial slip is small, and that the resistance to further slip (when the members hole walls are in contact with opposite sides of the fastener shank) is thereafter much higher. The initial slip is not acceptable.

SUMMARY OF THE INVENTION

The present invention is intended to overcome this problem, by increasing the resistance to such initial slip.

The invention provides a method of securing together apertured sheet-like members which are in face to face relationship with superposed apertures, which method comprises the steps of:

inserting the shank of a rivet through the aperture of at least one of the members;

inserting the shank of the rivet through the aperture of at least another of the members;

providing a deforming die adjacent one of the members and around the aperture;

providing a blind head die adjacent one of the members and around the aperture; and moving the heads of the rivet towards each other thereby to compress the members between the deforming die and the blind head so as to deform at least one of the members, so that the sheets, around their superposed apertures, are similarly deformed transversely into engagement with each other, the rivet heads maintaining the members in engagement as aforesaid, thereby to enhance resistance to relative slipping movement of the members; in which the rivet is a blind rivet and the deforming die is provided by a head of the blind rivet.

Further features of the invention are identified in the accompanying claims.

Some embodiments of the invention will now be described by way of example and with reference to the accompanying drawings, in which:

FIGS. 1A, 1B & 1C show successive stages in a method of securing together of two relatively thin, deformable sheets by means of a blind rivet;

FIGS. 2A, 2B and 2C correspond to FIGS. 1A, 1B & 1C respectively but also illustrate part of the rivet installation tool used;

DESCRIPTION OF THE PREFERRED EMBODIMENTS

Figure 1A:
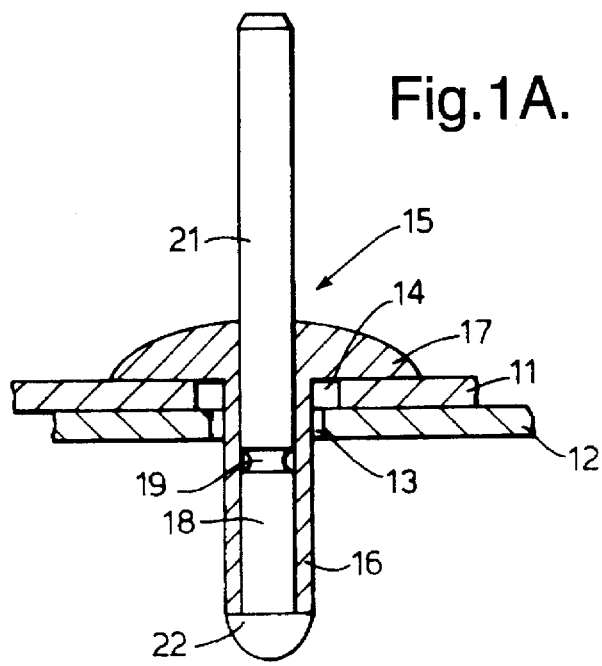
Figure 1B:
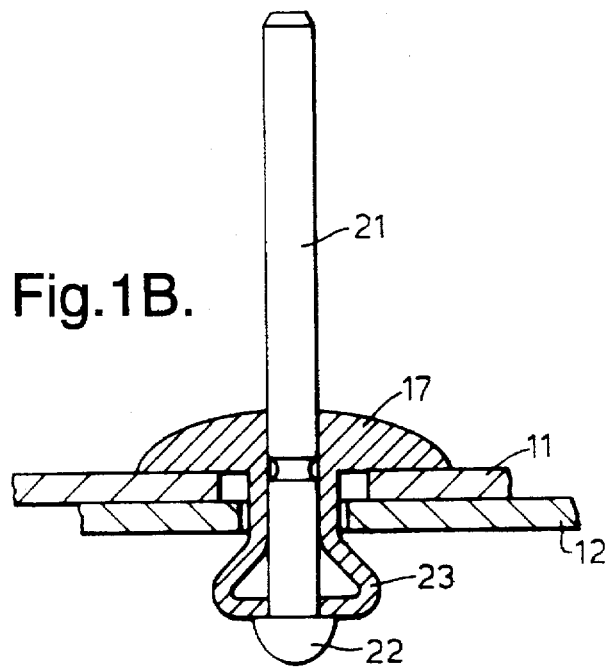
Figure 1C:
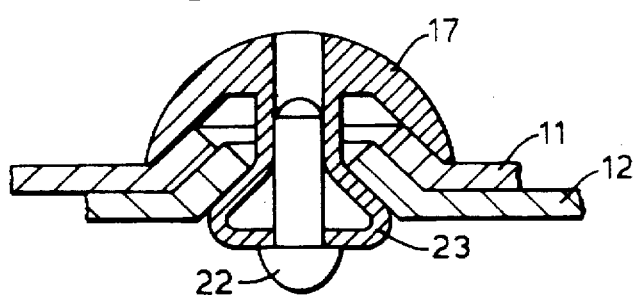

Referring first to the example shown in FIGS. 1A, 1B & 1C, the sheet-like members to be formed comprise two relatively thin steel sheets, a front sheet 11 and a rear sheet 12, typically of thickness about 0.7 mm each. The rear sheet is provided with a circular pre-punched hole 13, and the front sheet 11 is provided with a circular pre-punched hole 14 of larger diameter than the hole 13. The front sheet hole 14 is larger than the rear sheet hole 13 to facilitate alignment of the holes, as previously described. The sheets are to be secured together by means of a blind rivet 15. As previously mentioned, in order to facilitate insertion of the rivet shank 16 through the holes 14 & 13 under workshop or factory assembly line conditions, the diameter of both holes is larger than that of the rivet shank, as is illustrated in FIG. 1A.

The blind breakstem rivet is of a type which is generally well known in the art of mechanical assembly, and is generally similar to the rivet widely known and commercially available under the registered trademark AVEX. Briefly, such a rivet comprises a steel shell including a tubular shank 16 with an integral radially enlarged preformed head 17 at one end, and a steel stem comprising a plugging portion 18 joined by a breakneck 19 of reduced diameter to a pulling portion 21. At the other end the stem is formed integrally with an enlarged head 22 which abuts the tail end of the shank 16. When the pulling portion 21 of the stem is pulled with respect to the shell head 17, the remote end pan of the shank 16 axially contracts and buckles radially outwardly to form a blind head, so that the sheets are secured together by compression exerted by the preformed head and the blind head.

The rivet 15 is inserted through the holes 11 and 12 so that the underside of the shell head 17 abuts the face of the front sheet 11, and the remote end of the shank 16 protrudes from the rear sheet 12, as illustrated in FIG. 1A.

In this example, when the rivet stem is pulled with respect to the shell (by means which will be described below with reference to FIGS. 2A, 2B & 2C), the tailmost part of the shank 16 contracts axially and expands radially outwardly to form a blind head 23. As illustrated in FIGS. 1B & 1C, the blind head is in the form of a single bulb of a tapered or partly-conical shape, in which its cross-sectional dimension is smallest adjacent the rear sheet 12 and increases progressively away from the rear sheet 12 and towards the stem head 22. It is well known in the art of designing and manufacturing blind breakstem rivets that the position and shape of the bulbed blind head can be controlled by modifying the configuration of the exterior of the shank, e.g. by crimping or rolling applied to the shell shank during manufacturing, usually after assembly of the shell on the stem, or by other means. For example, one shank configuration which has been found to produce the blind head shape illustrated FIG. 1B consists of a long crimp in the shank at its tail end (adjacent the stem head) together with a narrow crimp adjacent the shell head 17.

Figure 2A:
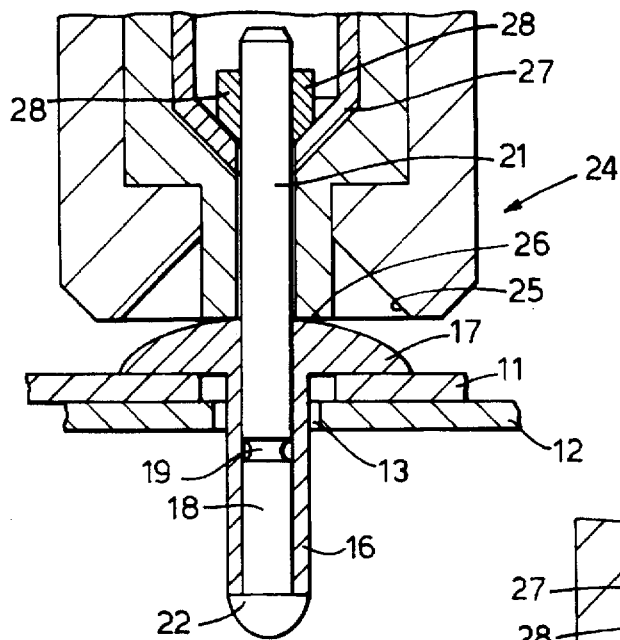
Figure 2B:
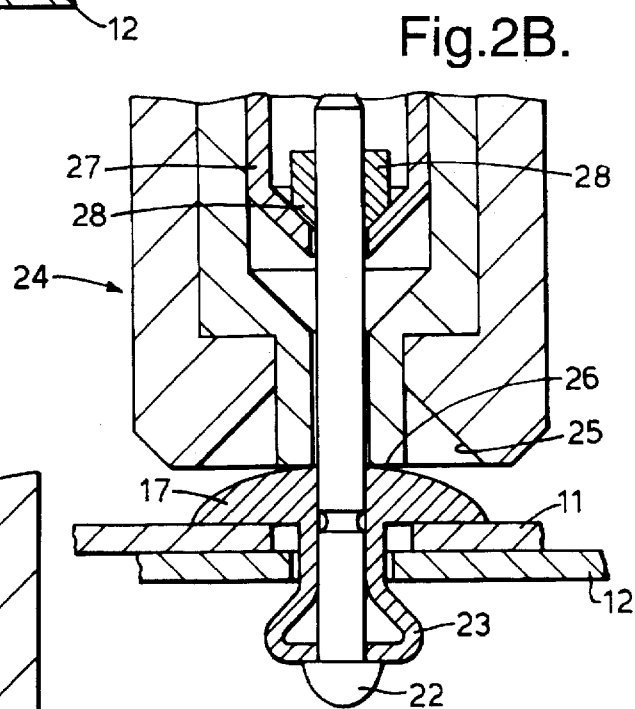
Figure 2C:
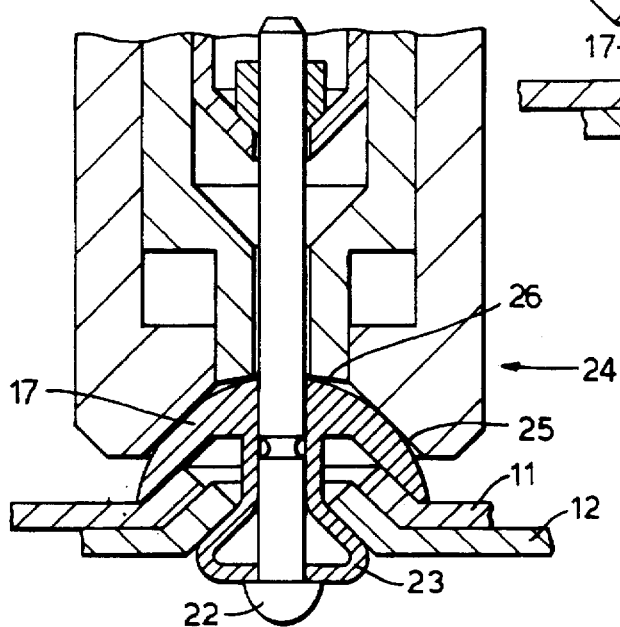

Blind breakstem rivets are commonly placed by means of pneumatically or hydraulically operated tools, and such tools are well known in the art. FIGS. 2A, 2B & 2C illustrate relevant parts of the tool 24. These are an outer tube having at its front end a recessed, tapering outer anvil 25, an inner tube reciprocable to a limited extent within the outer tube and carrying at its front end an annular inner anvil 26, and a reciprocable collet 27 carrying jaws 28 for gripping the pulling portion 21 of the stem. The inner anvil 26 is reciprocable with respect to the outer anvil 25, and the collet 27 is reciprocable with respect to both anvils, by means of hydraulic piston and cylinder devices within the tool. One suitable tool is a modified version of that commercially available under the designation CHERRY G784 HYDROSHIFT RIVETER (CHERRY is a registered trademark). The G784 tool has the anvils and jaws as described above, and is arranged to place a blind rivet by first contacting the rivet head with the outer anvil 25 and retracting the jaws 28 to pull the rivet stem, and then advancing the inner anvil 26 with respect to the jaws to actuate a locking device on the rivet.

The tool 24 of the present example is a G784 tool which has been modified so that the sequence of operation of the inner and outer anvils is reversed. Thus, the inner anvil 26 is first advanced to contact the rivet preformed head 17 at a first zone around and adjacent the stem pulling portion 21, as illustrated in FIG. 2A. The collet 27 is then retracted to pull the rivet stem while supporting the reaction to this on the aforesaid zone of the rivet head. This causes formation of the blind head 23 of the rivet, as illustrated in FIGS. 1B and 2B. Continued operation of the tool then advances the outer anvil 25 with respect to the inner anvil 26, and collet 27, while still pulling the stem by means of the collet 27 and jaws 28. Since the outer anvil 25 contacts the shell head 17 at a zone radially outwardly and nearer its periphery, the result is that the head 17 of the rivet shell deforms so that while its radially outer periphery remains in contact with and supported by the front sheet 11, the radially more inward part of the head bends upwardly into the outer anvil 25. The area of the sheets around the two holes 11, 12 is thus deformed between a convex die, provided by the tapering blind head 23 of the rivet, and a concave die, provided by the concave underside of the shell head 17. The underside of the shell head becomes increasingly more concave as the rivet stem is pulled further into the shell, until a position similar to that illustrated in FIG. 2C is reached. Continued increase of tension applied to the pulling portion 21 of the stem results in the breakneck 19 fracturing, and the tool and broken-off pulling portion 21 are removed, leaving the rivet installed in, and securing together, the two sheets.

Thus the two sheets have been deformed transversely into engagement with each other, this engagement being maintained by the compression exerted by the rivet heads, connected by the tension in the rivet shank. This engagement of the transverse deformations in the sheets substantially enhances the resistance of the sheets to relative slipping, as previously explained. In a typical case, it has been found that the resistance of the sheets to initial slip is multiplied by a factor of about three, compared with that provided by a similar breakstem rivet which does not thus deform the sheets.

Figure 3A:
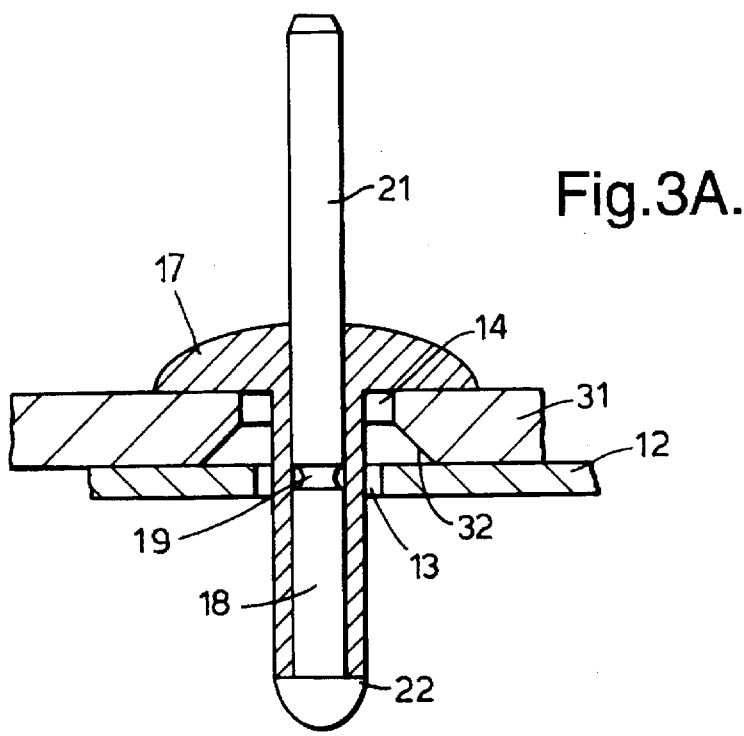
FIGS. 3A, 3B & 3C show successive stages in a method of securing together of a relatively thin, deformable sheet and a relatively thick, stronger sheet.
Figure 3B:
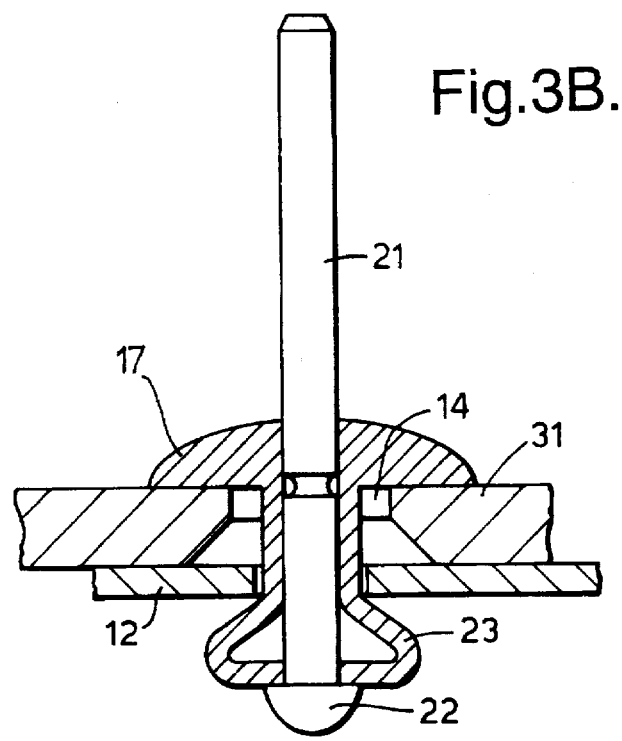
Figure 3C:
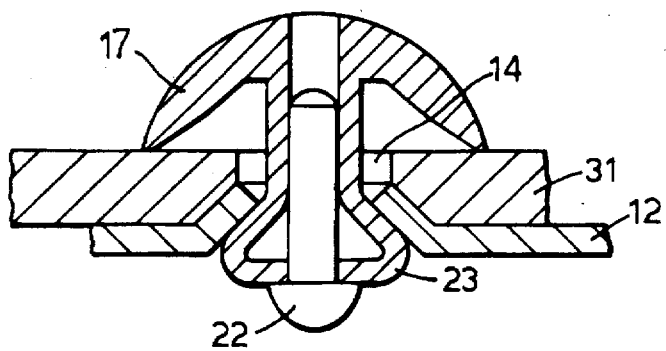
Figure 4A:
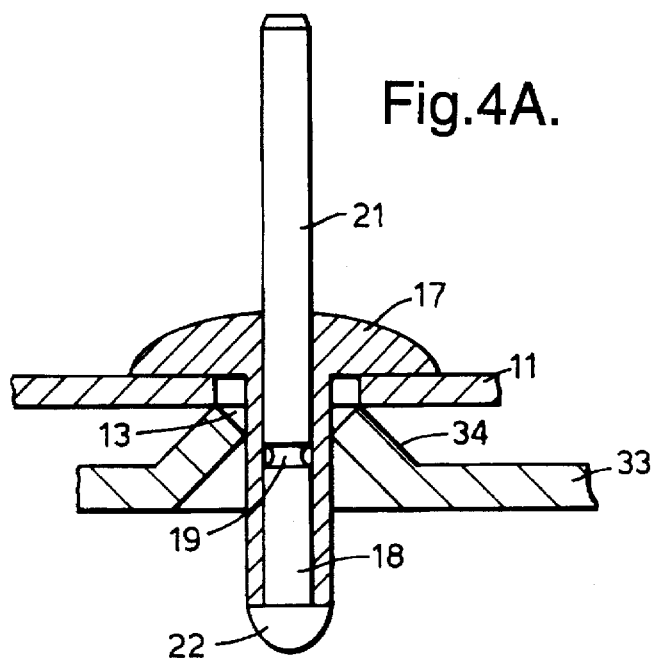
FIGS. 4A, 4B & 4C illustrate successive stages on a method of securing together of a relatively thick, strong sheet and a relatively thin, deformable sheet.
Figure 4B:
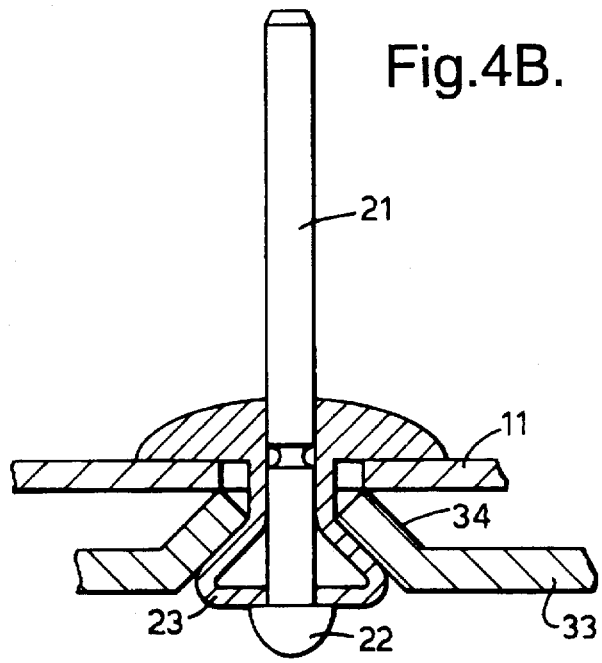
Figure 4C:
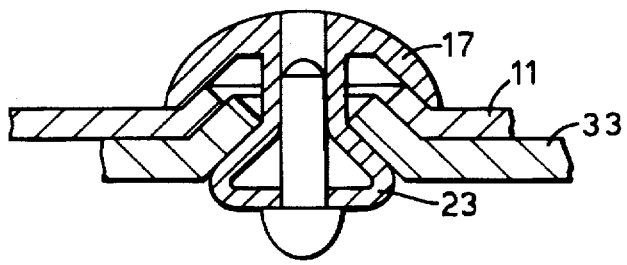

The example method of securing sheets together illustrated in FIGS. 1A, 1B, 1C and 2A, 2B and 2C is appropriate where the sheets are both relatively thin and are capable of sufficient deformation by the forces which can be applied by the rivet blind head and rivet preformed head. However, if it is required that one or other of the sheets is so much stronger that it cannot be thus deformed, a second example method may be employed. This is a variation of the first example method in which the stronger sheet is used to provide one of the deforming dies, FIGS. 3A, 3B & 3C (which correspond to FIGS. 1A, 1B & 1C respectively, like parts being indicated by like reference numerals) illustrate a method which may be employed when the front sheet 31 is thicker and stronger. This method provides the concave die by a countersink 32, around the front sheet hole 14, in the rear face of the front sheet and facing towards the rear sheet 12. The rivet is placed in the same way as in the first example, by means of the same tool (not shown), a similar blind head 23 being formed as shown in FIG. 3B. The part of the rear sheet 12 around the hole 13 is then deformed by the blind head 23 into the countersink 32, as illustrated in FIG. 3C. Since the total sheet thickness (known as the grip length) in this example is greater than in the first example, and moreover the zone of the front sheet which the outer periphery of the shell head contacts is not displaced away from the shell head, this example must employ a rivet which is longer than the rivet in the first example.

Where the rear sheet 33 is stronger, a third example method may be employed, in which the convex die may be provided by a preformed deformation of the rear sheet, as illustrated in FIGS. 4A, 4B & 4C. Thus the rear sheet is deformed around its hole 13, to provide a tapering front surface 34 as the convex die, on the front face of the rear sheet 33 and facing towards the front sheet 11. The rivet blind head 23 is received within the corresponding concavity in the rear sheet as illustrated in FIG. 4B, and thereafter the preformed head of the rivet shell acts to deform the front sheet over the tapering surface 34, as illustrated in FIG. 4C.

A further example of the method is illustrated in FIGS. 5A, 5B, 5C, 6A, 6B & 6C. In this example, a rivet is first installed in one sheet, leaving the stem, together with an undeformed part of the rivet preformed head, protruding from the front face of the sheet. An appropriate part of a second sheet is then positioned between the aforesaid part of the head and the first sheet. That part of the head is then deformed to secure the second sheet to the first.

Figure 5A:
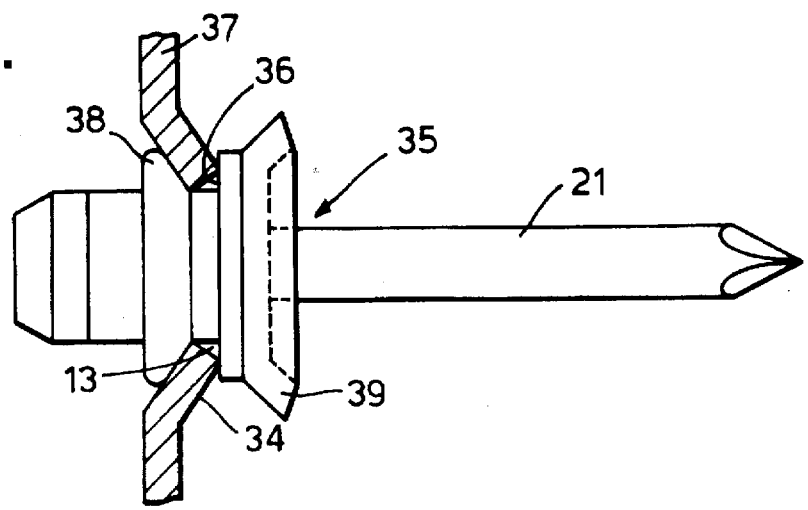
FIGS. 5A, 5B, 5C illustrate successive stages in another method of securing together a relatively strong sheet and a relatively deformable one.

Thus the rivet 35 (FIG. 5A) has a preformed head with a shoulder 36 facing towards the sheet 37, which is predeformed to provide a convex die surface 34 around the hole 13. The preformed head of the rivet includes a flange 39 which is directed radially outwardly and also away from the blind head. The shoulder 36 engages the sheet 37 around the hole's periphery, and together with the blind head 38 secures the rivet to the sheet 37, but without the flange 39 being deformed and without the pulling portion of the stem being broken off (FIG. 5A). This is achieved by positioning the afore-described placing tool over the protruding rivet stem and actuating the tool to perform only the first operation previously illustrated, using the radially inner anvil.

Figure 5B:
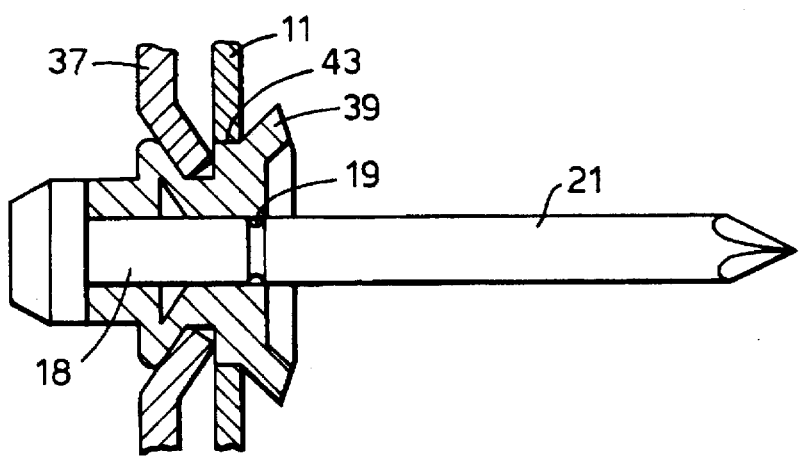
Figure 5C:
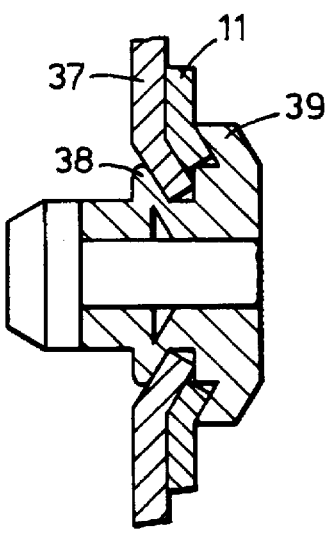

A second sheet 11 is then inserted between the flange 39 and the sheet 37, as illustrated in FIG. 5B. This may be done as illustrated in FIGS. 6B & 6C. A keyhole slot 41 is provided on the sheet 11, having an enlarged hole part 42 which is large enough to pass over the rivet head flange 39, joined to a slot pan 43 which is narrow enough to be trapped by the flange 39. The enlarged hole part 42 is passed over the protruding rivet stem 21 and over the flange 39, and the sheet 11 is slid sideways so that the slot part 43 engages under the flange 39, as illustrated in FIGS. 5B and 6C. The placing tool is then offered up to the protruding rivet stem and the securing completed by actuating the tool to perform the second operation as previously described, using the radially outer anvil. This deforms the flange 39 towards the concave die surface provided by the raised surface 34 of the first sheet in order to secure the second sheet 11 to the first sheet 37. The pulling portion of the rivet stem is then broken off, leaving the two sheets secured together, as illustrated in FIG. 5C.

Figure 6A:
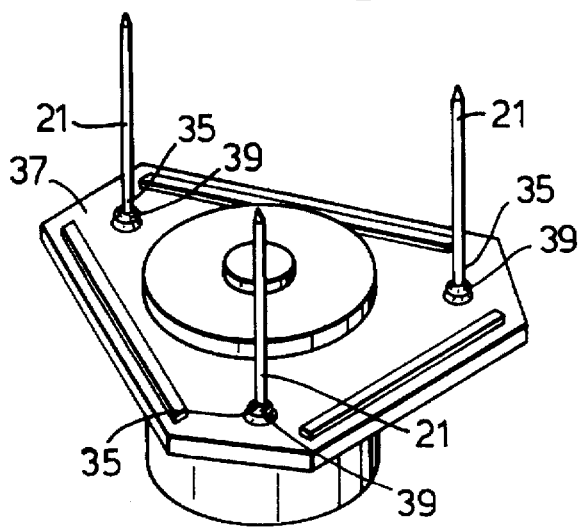
FIG. 6A is a perspective view of part of an assembly to which the method shown in FIGS. 5A, 5B & 5C is applied.
Figure 6B:
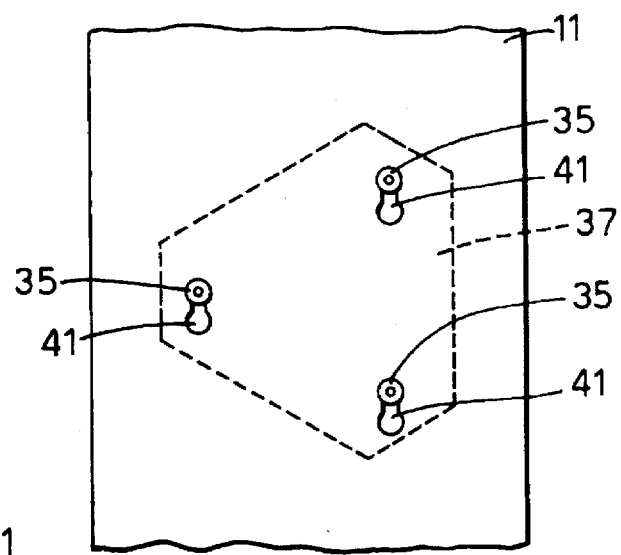
FIG. 6B is a plan view of the assembly.
Figure 6C:
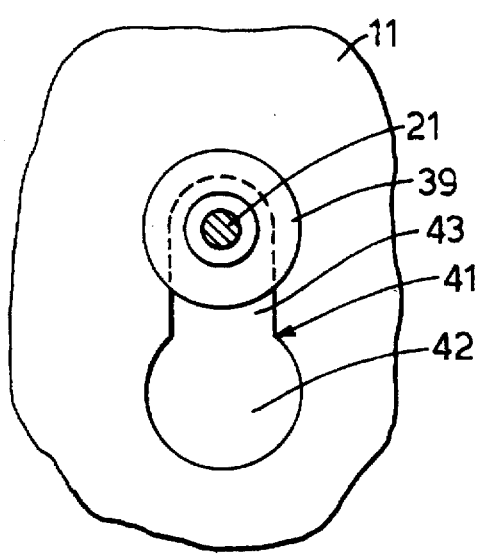
FIG. 6C is an enlarged view of part of FIG. 6B.

FIGS. 6A, 6B & 6C illustrate a particular application of this example method, in which three rivets are provided in triangular relationship on one sheet which is part of an assembly, and a corresponding three keyhole slots are provided on the second sheet, which is thereby secured to the assembly.

The invention is not restricted to the details of the foregoing examples.

For instance, the blind head formed on the rivet shank may have a different configuration. Instead of having its diameter increasing progressively, it could be formed of two bulbs of different diameters, the smaller diameter one nearer the preformed head and the larger diameter one more remote from the preformed head. More than two bulbs of such graded diameters could be employed.

Instead of using a placing tool with separate concentric inner and outer anvils as illustrated in FIGS. 2A, 2B and 2C, it would be possible to use a placing tool with a single anvil having a concave face, of the type already known in the art of blind riveting for installing blind rivets having preformed heads of countersink configuration and deforming the heads to domehead configuration. When this modification is applied to the present invention, it would probably need a rivet having a stronger preformed head and stronger stem than is necessary with a tool of the type illustrated in FIGS. 2A, 2B and 2C.

We claim:

1. A method of securing together first and second sheet members which are in a face to face relationship with superposed apertures, which method comprises the steps of:

inserting the shank of a rivet having a preformed first head through an aperture of the first member;

inserting the shank of the rivet through an aperture of the second member;

forming an enlarged second head on the shank adjacent said second member and around the aperture of said second member;

moving the first and second heads of the rivet towards each other and compressing the first and second members, thereby providing a first deforming die adjacent said first member and around the aperture of said first member by deforming said first head of the rivet so as to have a concave shape facing towards said first member and deforming at least one of the first and second members, so that the first and second members, around the respective apertures thereof, are similarly deformed transversely into engagement with each other, the first and second rivet heads maintaining the first and second members in engagement and enhancing resistance to relative slipping movement of the first and second members;

wherein the rivet comprises a blind rivet and wherein the second head of said rivet comprises an enlarged blind head and the deforming of the first head occurs after forming of the enlarged second head.

2. A method as claimed in claim 1 which comprises initially superposing the apertures of the members and inserting the rivet shank through the apertures.

3. A method as claimed in claim 1, which comprises providing the enlarge blind head of the rivets as a second deforming die.

4. A method as claimed in claim 1, which comprises:
   forming said enlarged blind head by gripping and pulling a pulling portion of the rivet located adjacent said preformed first head.

5. A method as claimed in claim 1, wherein the enlarged blind head of the rivet is smaller in cross-sectional dimension nearer the second member and is larger in cross-sectional dimension further away from the second member.

6. A method as claimed in claim 5, wherein the cross-sectional dimension of the rivet blind head increases progressively.

7. A method as claimed in claim 5 or 6, wherein the blind head comprises a single bulb.

8. A method as claimed in claim 1 which comprises providing the deforming die at an upper surface of the first member around the aperture thereof.

9. A method as claimed in claim 1, which comprises carrying out the step of deforming the preformed head by first contacting a free side of the performed head at a first zone around and adjacent a stem of the rivet, and thereby supporting a reaction to pulling on the stem to form the enlarged blind head, and then contacting a free side of the preformed head at a second zone radially outwardly and nearer a periphery thereof, thereby deforming the periphery of the preformed head, relative to the first zone towards the adjacent first member.

10. A method of securing together first and second sheet members which are in a face to face relationship with superposed apertures, which method comprises the steps of:

inserting the shank of a rivet having a preformed first head through an aperture of the first member, said first member having a countersink formed therein which comprises a first forming die;

inserting the shank of the rivet through an aperture of the second member;

forming an enlarged second head on the shank adjacent said second member and around the aperture of said second member so as to form a second deforming die;

moving the first and second heads of the rivet towards each other and compressing the first and second members so as to compress the second member into the first forming die and deforming said second member by said second deforming die, so that the first and second members around the respective apertures thereof are similarly deformed transversely into engagement with each other, the first and second rivet heads maintaining the first and second members in engagement and enhancing resistance to relevant slipping movement of the first and second members;

wherein the rivet comprises a blind rivet, the second head of the rivet comprises an enlarged blind head; and deforming the first head after forming of the enlarged second head.

11. A method of securing together first and second sheet members which are in a face to face relationship with superposed apertures, which method comprises the steps of:

inserting the shank of a rivet having a preformed first head through an aperture of the first member;

inserting the shank of the rivet through an aperture of a preformed deformation of second member, said preformed deformation comprising a first deforming die;

forming an enlarged second head on the shank adjacent said second member and around the aperture of said second member;

moving the first and second heads of the rivet towards each other and compressing the members so as to provide a second deforming die adjacent said first member and around the aperture of said first member by deforming said first head of the rivet so as to have a concave shape facing towards said first member and deforming at least one of the first and second members with said first deforming die so that the first and second members, around the respective apertures thereof, are similarly deformed transversely into engagement with each other, the first and second rivet heads maintaining the first and second members in engagement and enhancing resistance to relevant slipping movement of the first and second members;

wherein the rivet comprises a blind rivet, the second head of the rivet comprises an enlarged blind head and the deforming of the first head occurs after forming of the enlarged second head.

12. A method of securing together first and second sheet members which are in a face to face relationship with superposed apertures, which method comprises the steps of:

inserting the shank of a rivet having a preformed first head with a flange through an aperture of a preformed first die member formed on the first member;

inserting a second member between the first member and the flange of the rivet;

deforming the flange of the rivet so as to form a second die wherein the first and second die members deform said second member into engagement with said first member around the respective apertures thereof, the first and second dies maintaining the first and second members in engagement and enhancing resistance to relative slipping movement of the first and second members and wherein said deforming of the second die occurs after deforming of the first die.

* * * * *